(12) United States Patent
Benning et al.

(10) Patent No.: US 10,952,813 B2
(45) Date of Patent: Mar. 23, 2021

(54) SPRING-DRIVEN PUMP FOR DISPENSING DISCRETE BURSTS OF LIQUID

(71) Applicant: KONINKLIJKE PHILIPS N.V., Eindhoven (NL)

(72) Inventors: Wolter F. Benning, Seattle, WA (US); Jeffrey Garrigues, Lake Stevens, WA (US); Brian Johanski, Snohomish, WA (US); Kevin Arnold Miller, Bellevue, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 684 days.

(21) Appl. No.: 15/571,878

(22) PCT Filed: Apr. 27, 2016

(86) PCT No.: PCT/IB2016/052367
§ 371 (c)(1),
(2) Date: Nov. 6, 2017

(87) PCT Pub. No.: WO2016/178118
PCT Pub. Date: Nov. 10, 2016

(65) Prior Publication Data
US 2018/0085189 A1 Mar. 29, 2018

Related U.S. Application Data

(60) Provisional application No. 62/158,174, filed on May 7, 2015.

(51) Int. Cl.
*A61C 1/00* (2006.01)
*A61C 17/02* (2006.01)
*A61C 17/028* (2006.01)
*A61C 17/022* (2006.01)
*B05B 1/02* (2006.01)
*B05B 7/24* (2006.01)
(Continued)

(52) U.S. Cl.
CPC ........ *A61C 1/0092* (2013.01); *A61C 17/0202* (2013.01); *A61C 17/022* (2013.01);
(Continued)

(58) Field of Classification Search
CPC .............. A61C 1/0092; A61C 17/0202; A61C 17/0217; A61C 17/022; A61C 17/028;
(Continued)

(56) References Cited

U.S. PATENT DOCUMENTS 3,742,608 A * 7/1973 Jones ..................... A61C 17/00
433/146
3,890,853 A * 6/1975 Feltz ...................... F16H 27/08
74/435
(Continued)

FOREIGN PATENT DOCUMENTS

CN 203943757 U 11/2014
JP 2002265076 A 9/2002
(Continued)

*Primary Examiner* — Valerie L Woodward

(57) ABSTRACT

An oral care device (10) with a pump assembly (12) including: a plunger assembly (52) having a rack assembly (74); a compressible spring (64) configured to exert a forward force on the plunger assembly; and a rack and pinion assembly (72) configured to exert a force on the plunger assembly opposite the forward force, wherein the rack assembly includes a plurality of rack teeth (74 a . . . 74 g) and the pinion assembly (76) includes a plurality of teeth (78) arranged around a portion of the pinion; where the plurality of rack teeth include an angled front surface (86) and an angled rear surface (87), the front surface of at least some of the plurality of rack teeth including a different angle than the rear surface, and further where at least some of the plurality of rack teeth include a pointed or rounded tip (82).

15 Claims, 8 Drawing Sheets

(51) Int. Cl.
*B05B 12/06* (2006.01)
*F04B 9/02* (2006.01)
*F04B 17/03* (2006.01)
*F04B 19/22* (2006.01)

(52) U.S. Cl.
CPC ........ *A61C 17/028* (2013.01); *A61C 17/0217* (2013.01); *B05B 1/02* (2013.01); *B05B 7/2464* (2013.01); *B05B 12/06* (2013.01); *F04B 9/02* (2013.01); *F04B 17/03* (2013.01); *F04B 19/22* (2013.01)

(58) Field of Classification Search
CPC ......... B05B 7/2464; B05B 12/06; F04B 9/02; F04B 19/22; F16H 27/08; F16H 55/26–288
See application file for complete search history.

(56) References Cited

U.S. PATENT DOCUMENTS

| | | | | |
|---|---|---|---|---|
| 3,966,359 | A * | 6/1976 | Woog | A46B 13/06 417/38 |
| 5,186,627 | A * | 2/1993 | Amit | A46B 7/06 134/6 |
| 5,224,500 | A * | 7/1993 | Stella | A61C 15/047 132/322 |
| 6,234,047 | B1 * | 5/2001 | Yamada | F16H 27/08 74/436 |
| 2006/0098535 | A1 | 5/2006 | Marki et al. | |
| 2009/0263294 | A1 | 10/2009 | Aoki et al. | |
| 2011/0244418 | A1 * | 10/2011 | Edwards | A61C 1/0092 433/90 |
| 2015/0147717 | A1 | 5/2015 | Taylor et al. | |
| 2015/0164612 | A1 | 6/2015 | Kloster | |
| 2015/0173850 | A1 * | 6/2015 | Garrigues | A61C 1/0092 433/80 |

FOREIGN PATENT DOCUMENTS

| | | |
|---|---|---|
| JP | 2011137497 A | 7/2011 |
| JP | 2012513795 A | 6/2012 |
| JP | 5067282 | 11/2012 |
| WO | 2010076694 A1 | 7/2010 |
| WO | 2013190428 A1 | 12/2013 |

* cited by examiner

SPRING-DRIVEN PUMP FOR DISPENSING DISCRETE BURSTS OF LIQUID

CROSS-REFERENCE TO PRIOR APPLICATIONS

This application is the U.S. National Phase application under 35 U.S.C. § 371 of International Application No. PCT/IB2016/052367, filed on Apr. 27, 2016, which claims the benefit of U.S. Provisional Patent Application No. 62/158,174, filed on May 7, 2015. These applications are hereby incorporated by reference herein.

FIELD OF THE INVENTION

The present disclosure is directed generally to oral care appliances configured to dispense discrete bursts or shots of liquid, and particularly to spring-driven pumps for oral care appliances.

BACKGROUND

Periodontal diseases are thought to be infectious diseases caused by bacteria present in dental plaques and biofilms. Removal of dental plaques and biofilms is highly important for the health of oral cavities. Tooth brushing is a highly effective method to remove dental plaque and biofilms from the teeth, provided the oral cleaning device is actually used in such a fashion to reach all areas where plaque resides.

Oral cleaning devices that clean the teeth with streams or bursts of liquid or a mixture of liquid droplets and air are effective at disrupting dental plaques and biofilm in the oral cavity, particularly in the interproximal areas of the teeth. These devices generally create liquid droplets when the liquid is brought into contact with a high velocity stream of air using a pump or similar arrangement.

Coordinated bursts of liquid and air use far less liquid per cleaning compared to a continuous stream of liquid. As a result, less liquid is used per cleaning and the user does not accumulate an uncomfortable volume of liquid in the mouth. This is particularly beneficial if the liquid is a mouthwash or similar liquid which shouldn't be swallowed by the user. Additionally, the alternating bursts of air and liquid provide superior dental plaques and biofilm removal and interdental cleaning.

Oral cleaning devices that provide for user-adjustable coordinated bursts of liquid and air with a single press of a trigger button enable the user to provide rapid multiple bursts for differing cleaning experiences. However, when producing rapid bursts of shots, there is the opportunity for the device to jam or lock due to the rapidity of the repeating motion of the mechanism.

Accordingly, there is a need in the art for oral cleaning devices that provide user-adjustable coordinated bursts of liquid and air with a reduced likelihood of mechanism jamming or locking.

SUMMARY OF THE INVENTION

The present disclosure is directed to inventive oral cleaning devices that deliver user-adjustable coordinated bursts of liquid and air. Various embodiments and implementations herein are directed to oral devices in which a user selects the number of liquid bursts that will be delivered per actuation and then activates the selected sequence of bursts with a single actuation. The oral cleaning device includes a spring-driven pump assembly with a rack and pinion drive mechanism configured to drive a plunger toward the proximal end of the nozzle with sufficient force to create the coordinated bursts of liquid and air from the nozzle. The rack and pinion drive assembly includes a rack with teeth having a forward-pitch geometry configured to reduce the likelihood of the rack and pinion misaligning, jamming, or locking, and can optionally include a pinion with a first tooth having a reduced height compared to the remaining pinion teeth.

Generally in one aspect, an oral care device is provided. The oral care device includes: a nozzle comprising a nozzle outlet configured to deliver a plurality of bursts of liquid and air to an oral cavity; a pump assembly comprising: a plunger assembly with a front portion and a rear portion, the rear portion comprising a rack assembly; a compressible spring configured to exert a forward force on the plunger assembly; and a rack and pinion assembly configured to exert a force on the plunger assembly opposite the forward force, wherein the rack and pinion assembly comprises the rack assembly, the rack assembly comprising a plurality of rack teeth and a pinion assembly, the pinion assembly comprising a plurality of teeth arranged around a portion of the pinion; and a motor configured to drive the rack and pinion assembly; wherein the plurality of rack teeth comprise an angled front surface and an angled rear surface, the front surface of at least some of the plurality of rack teeth comprising a different angle than the rear surface, and further wherein at least some of the plurality of rack teeth comprise a pointed or rounded tip.

According to an embodiment, a plurality of the rack teeth comprises a first height, the first height between approximately 0.5 and 3.0 mm.

According to an embodiment, the pointed or rounded tips of the plurality of rack teeth comprise a tip spacing, the tip spacing being between 2 and 4 mm.

According to an embodiment, each of the second through next to last of the plurality of rack teeth comprise a pointed or rounded tip and a front surface comprising a different angle than the rear surface.

According to an embodiment, each of the second through next to last of the plurality of rack teeth comprise a first height, and further wherein the first and last of the plurality of rack teeth comprise a second height, the second height being greater than said first height.

According to an embodiment, the pinion assembly further comprises a first section lacking teeth.

According to an embodiment, during operation of the oral care device the pump assembly is configured to use the rack and pinion assembly to move the plunger assembly against the forward force of the compressible spring and then release the plunger assembly.

According to an embodiment, the device is further configured to allow air to enter a mixing chamber as the pump assembly uses the rack and pinion assembly to move the plunger assembly against the forward force of the compressible spring.

According to an embodiment, the first tooth of the pinion assembly comprises a first height, the first height being less than a height of the other of the plurality of pinion teeth. According to another embodiment, one or more of the teeth of the rack may be shorter than the height of the remainder of the rack teeth.

According to an aspect is a pump assembly for an oral care device. The pump assembly includes: a plunger assembly with a front portion and a rear portion, the rear portion comprising a rack assembly; a compressible spring configured to exert a forward force on the plunger assembly; and a rack and pinion assembly configured to exert a force on the plunger assembly opposite the forward force, wherein the rack and pinion assembly comprises the rack assembly, the rack assembly comprising a plurality of rack teeth and a pinion assembly, the pinion assembly comprising a plurality of teeth arranged around a portion of the pinion; wherein the plurality of rack teeth comprise an angled front surface and an angled rear surface, the front surface of at least some of the plurality of rack teeth comprising a different angle than the rear surface, and further wherein at least some of the plurality of rack teeth comprise a pointed or rounded tip.

According to an aspect is an oral care device. The oral care device includes: a nozzle comprising a nozzle outlet configured to deliver a plurality of bursts of liquid and air to an oral cavity; a pump assembly comprising: a plunger assembly with a front portion and a rear portion, the rear portion comprising a rack assembly; a compressible spring configured to exert a forward force on the plunger assembly; and a rack and pinion assembly configured to exert a force on the plunger assembly opposite the forward force, wherein the rack and pinion assembly comprises the rack assembly, the rack assembly comprising a plurality of rack teeth and a pinion assembly, the pinion assembly comprising a plurality of teeth arranged around a portion of the pinion, wherein the first tooth of the pinion assembly comprises a first height, the first height being less than a height of the other of the plurality of pinion teeth; and a motor configured to drive the rack and pinion assembly; wherein the plurality of rack teeth comprise an angled front surface and an angled rear surface, the front surface of each of the second through next to last of the plurality of rack teeth comprising a different angle than the rear surface, wherein each of the second through next to last of the plurality of rack teeth comprise a pointed or rounded tip, and further wherein each of the rack teeth comprises a first height between approximately 0.5 and 3.0 mm.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of an oral cleaning device that delivers coordinated bursts of liquid and air. More generally, Applicants have recognized and appreciated that it would be beneficial to provide an oral cleaning device in which the spring-driven pump assembly has a reduced likelihood of misaligning, jamming, locking, or otherwise interfering with operation of the device. A particular goal of utilization of certain embodiments of the present disclosure is to provide an improved spring-driven pump assembly with a rack and pinion drive mechanism configured to drive a plunger toward the proximal end of the nozzle with sufficient force to create the coordinated bursts of liquid and air from the nozzle. Accordingly, the oral cleaning device comprises a rack and pinion drive assembly includes a rack and pinion with teeth having a particular geometry configured to reduce the likelihood of misaligning, jamming, or locking. This provides for improved operation of the oral cleaning device and thus better cleaning.

The improved pump disclosed and described herein can be used with any oral care appliance for cleaning teeth using coordinated bursts of air and fluid. One example of an oral care appliance that the improved nozzle design can be used with is any Airfloss® device available from Koninklijke Philips Electronics N.V.

Figure 1:
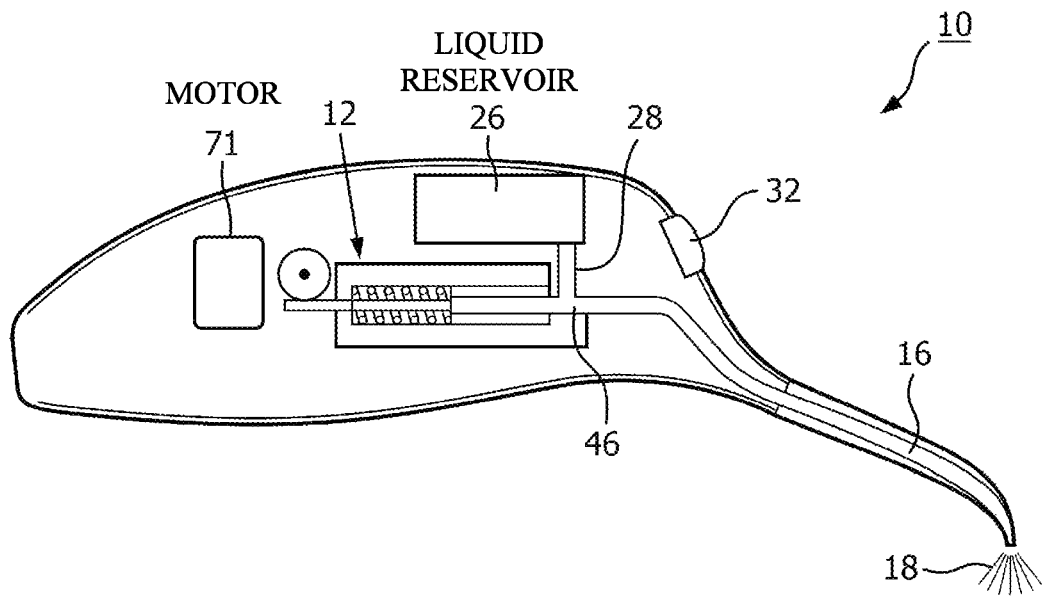
FIG. 1 is a schematic representation of an oral cleaning device in accordance with an embodiment.

In view of the foregoing, various embodiments and implementations are directed to an oral cleaning device having a spring pump with an improved rack and pinion design to improve functioning and reduce jamming. Referring to FIG. 1, in one embodiment, is a schematic cutaway representation of an oral cleaning device 10. Oral cleaning device 10 includes an outer housing which can be a plastic or other sufficiently hard or durable plastic. Oral cleaning device 10 includes a nozzle 16 with a nozzle outlet 18, and an air/liquid burst pump 12 which is driven by motor 71.

According to an embodiment of device 10, elongated nozzle 16 extends outwardly from the device and can have a curved portion at the distal end thereof with a nozzle outlet 18, through which a spray of liquid droplets is directed for cleaning action against dental regions of the teeth. The curved portion assists in convenient positioning of the nozzle 16 in the mouth by the user.

Device 10 also includes an internal liquid reservoir 26 for a liquid such as water, mouthwash, cleaning liquid, or other liquid. The liquid reservoir 26 is in communication with a liquid reservoir door or opening, through which liquid can be added to the reservoir. Liquid in the reservoir is moved to the vicinity of the inlet orifice within the nozzle, typically by a pump, by passive aspiration, or by another mechanism. For example, as shown in FIG. 1, the liquid reservoir 26 supplies the liquid to a mixing chamber 46 via an inlet line 28.

Oral cleaning device 10 also includes a handle which can be ergonomically sized and/or shaped to fit within a variety of hand sizes including children and adults. The handle of the device includes an actuation switch 32 that activates the oral device and controls the actuation of the pump, which in operation produces a series of bursts or shots of liquid and air mixed together from the mixing chamber 46 through the nozzle 16 and thus out nozzle outlet 18. During use the actuation button in this embodiment is most comfortably activated by pressing on the button with the thumb, but any finger could be used.

The liquid droplets created by the oral cleaning device 10 can be of various sizes, and the speed of the droplets can vary from relatively low speed, e.g. 10 meters per second, to a high speed of 200 meters per second or even greater. Typically, however, a 50 m/sec droplet velocity with droplets in a size range of 5 microns-0.5 mm will provide effective dental cleaning.

The oral cleaning device also includes a control unit which controls the operation of the device pursuant to the mode setting and in response to each actuation. If the mode setting is for more than a single burst, the control unit quickly cycles a drive gear to deliver the number of bursts selected. The control unit may include computer hardware and/or software with button and sensor inputs, and outputs in electrical control of motors, pumps, and optionally valves to deliver the user-selected number of liquid-air bursts.

Figure 2:
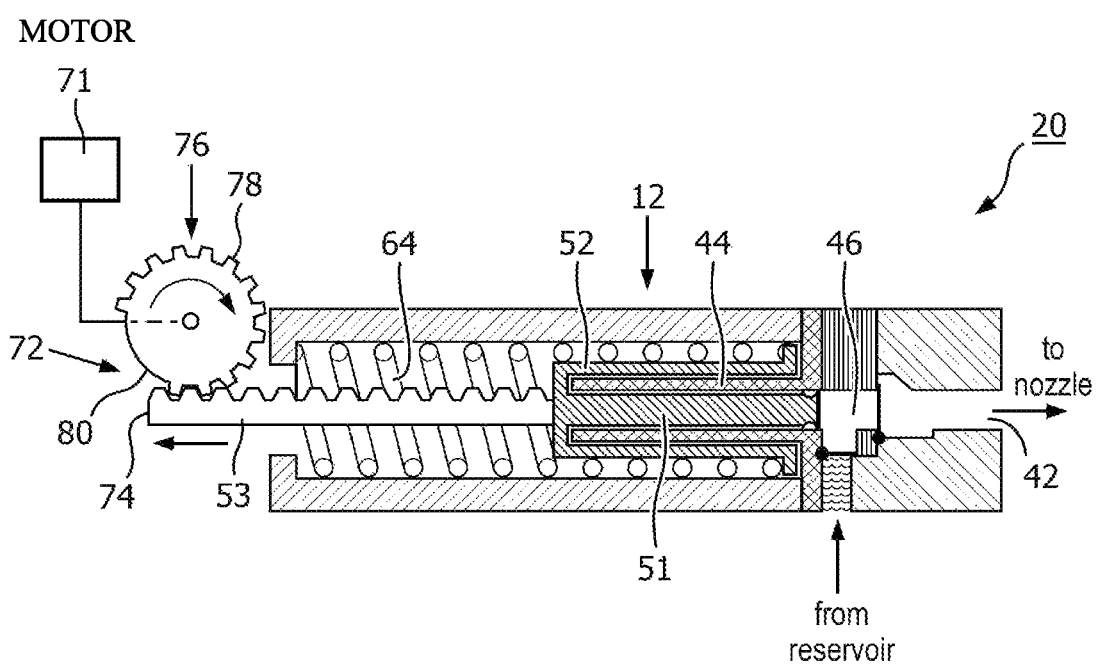
FIG. 2 is a schematic representation of a pump assembly of an oral cleaning device in accordance with an embodiment.

Referring to FIG. 2, in one embodiment, is a mechanical spring-drive system 20 configured to create a selected liquid droplet spray for an oral cleaning device 10. System 20 includes a motor 71 and gear train arrangement with a drive pinion 76 and a rack 74. The pump 12 includes a cylindrical plunger 52 having a cylindrical plunger sleeve 44 with a central portion therein. The plunger has a front portion 51 and a rear portion 53. The rack 74 is positioned along the rear portion 53 of plunger 52. The rack 74 and plunger 52 may be a single component, or can be two or more components. Positioned around the outside of the plunger 52 is a compressible spring 64, the direction of force of the compressible spring 64 extending along the axis of the rack 74. The forward end of spring 64 is positioned against a lip at a distal end of the plunger 52, while the rear end of spring 64 is positioned against an inwardly extending portion of the pump housing. Drive pinion 76 in the embodiment shown has an open space 80 with teeth missing at a selected position on its periphery, such that when the open space 80 comes adjacent the gear rack 74 on the plunger 52, the plunger releases since there are no meshed gears to hold it back.

During operation, the spring-drive system 20 drives the plunger 52 with drive pinion 76 engaging rack 74 on plunger 52. As the drive pinion 76 rotates, plunger 52 is moved backward within the device 10 against the action of a compression spring 24. At the same time, air is drawn into a mixing chamber 46 in the appliance, which could be the interior of the appliance, or a separate volume within the interior of the appliance. As shown in FIG. 2, for example, the plunger 52 is at its most forward position adjacent the forward end of the housing and against the base portion of the plunger sleeve 44. The rack 74 is fully forward, with the teeth 78 of the drive pinion 76 just engaging the read end of the rack 74.

Figure 3:
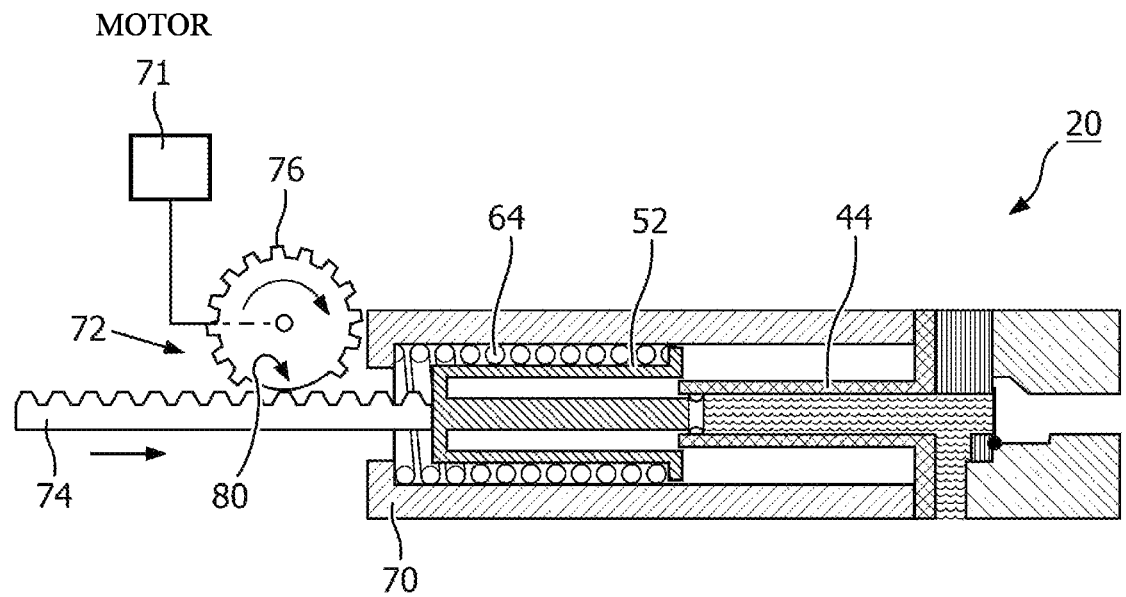
FIG. 3 is a schematic representation of a pump assembly of an oral cleaning device in accordance with an embodiment.

Referring to FIG. 3, in one embodiment, is a mechanical spring-drive system 20 in which the rack 74 is fully retracted. When the activation button 32 is pressed by the user, the motor 71 begins to operate such that the pinion gear 76 rotates, the teeth 78 of the pinion gear 76 engages the teeth of the rack, moving the rack toward the rear and pulling the plunger 52 and spring 64 backward. The spring compresses and liquid is drawn from liquid reservoir 26 through inlet line 28 into the central portion of the cylindrical plunger sleeve 44. When the rack and plunger are pulled to their rearmost position by the motor, the spring is fully compressed. The motor continues to move the pinion until the missing teeth section 80 of the pinion 76 comes adjacent to the rack 74 such that there is no longer a gear contact between teeth on the pinion 76 and the teeth on the rack 74. This results in disengagement between the pinion 76 and the rack 74.

Figure 4:
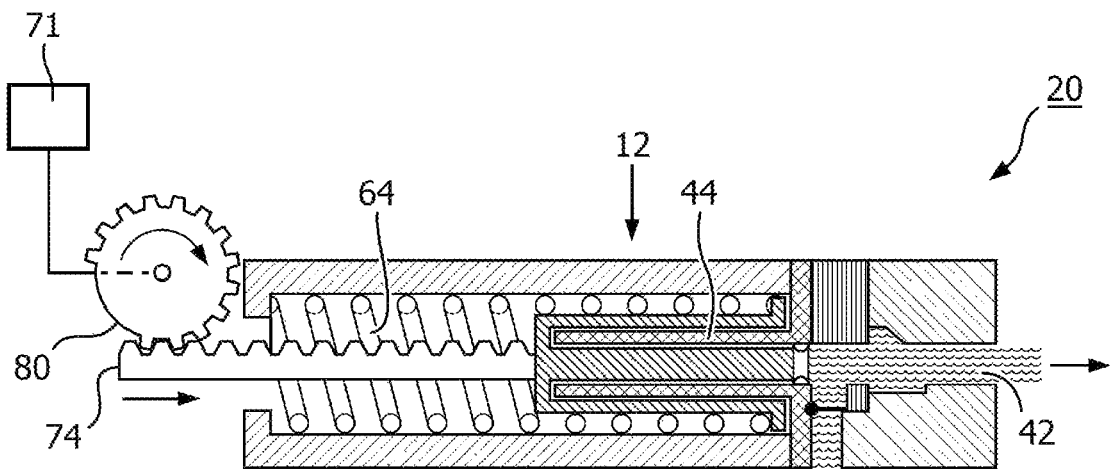
FIG. 4 is a schematic representation of a pump assembly of an oral cleaning device in accordance with an embodiment.

Referring to FIG. 4, in one embodiment, is a mechanical spring-drive system 20 in which the rack 74 is fully extended. Once the rack is released due to the missing teeth section 80 of the pinion 76, the rack moves quickly forward, driven by the release action of the compressed spring 64, thereby driving the plunger 52 forward. This action drives the air and liquid in the central portion of the cylindrical plunger sleeve 44 forward at high speed until the spring 64 returns to its rest, or non-compressed, position. When the fast-moving liquid and air mixture is propelled forward, a spray of liquid droplets is produced and propelled forward out the outlet opening 42 into the nozzle 16 and out the nozzle outlet 18.

The mechanical spring-drive system 20 will repeat this process in quick succession as needed to produce the number of bursts selected by the operator to be implemented by a single press of the activation switch 32. The system should then be ready for a repeat of this cycle when the operator presses the activation switch again.

Figure 5A:
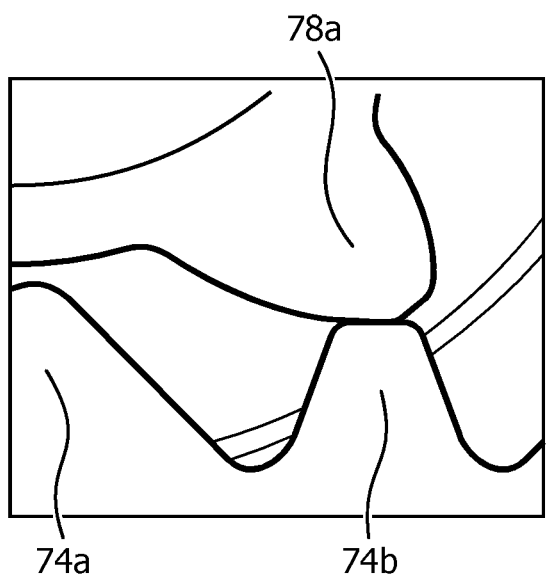
FIG. 5A is a schematic representation of a prior art pump assembly rack and pinion.
Figure 5B:
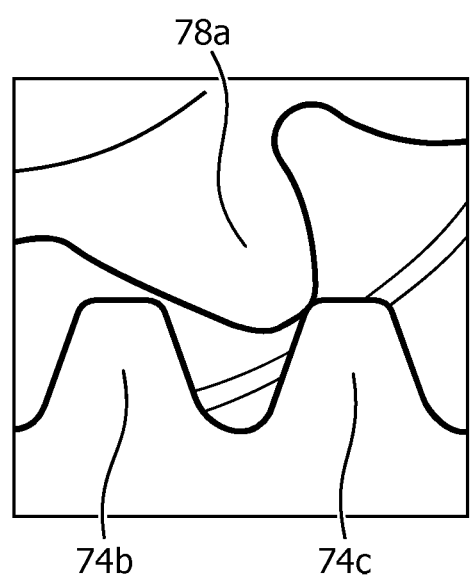
FIG. 5B is a schematic representation of a prior art pump assembly rack and pinion.

As a result of the rapid cycling of the mechanical spring-drive system 20 when producing the multiple bursts, a misalignment of the rack and pinion mechanism 72 can occur, where the first tooth of the pinion gear 78a can either hang up on one of the teeth of the rack 74 rather than fully releasing such that the first gears of the rack 74a and pinion 78a are engaged. A possible misalignment is shown in FIG. 5A, where the first pinion tooth 78a, rather than coming in contact with the first tooth of the rack 74a, comes in contact with the flattened surface of the second (or a subsequent tooth) of the rack 74b. Another possible misalignment is shown in FIG. 5B, where the first pinion tooth 78a becomes misaligned between two subsequent teeth 74b and 74c.

Figure 6:
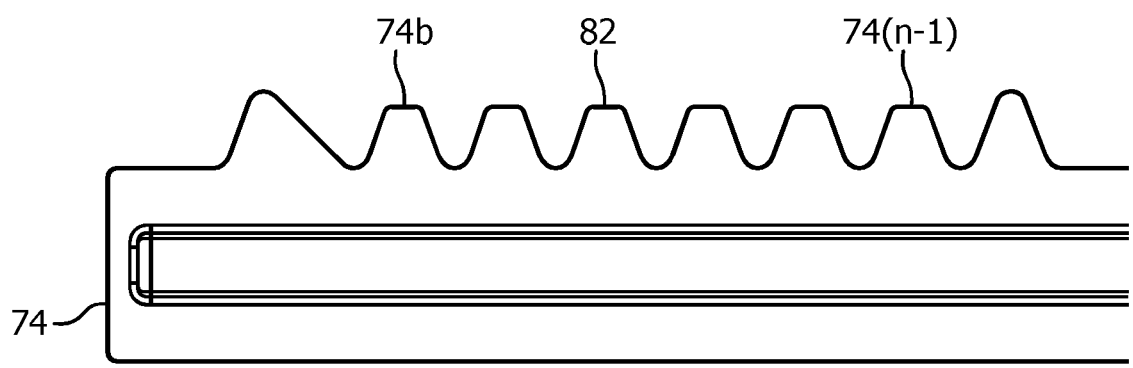
FIG. 6 is a schematic representation of a prior art rack of an oral cleaning device.

FIG. 6, for example, is a schematic representation of a rack 74 according to the prior art. Each of teeth 74b through 74(n-1) has a flattened top surface 82. This flattened top surface results in a structural relationship between the pinion teeth 76 and rack teeth 74 such that a misalignment of the rack and pinion mechanism 72 can occur as shown in FIGS. 5A and 5B.

Figure 7:
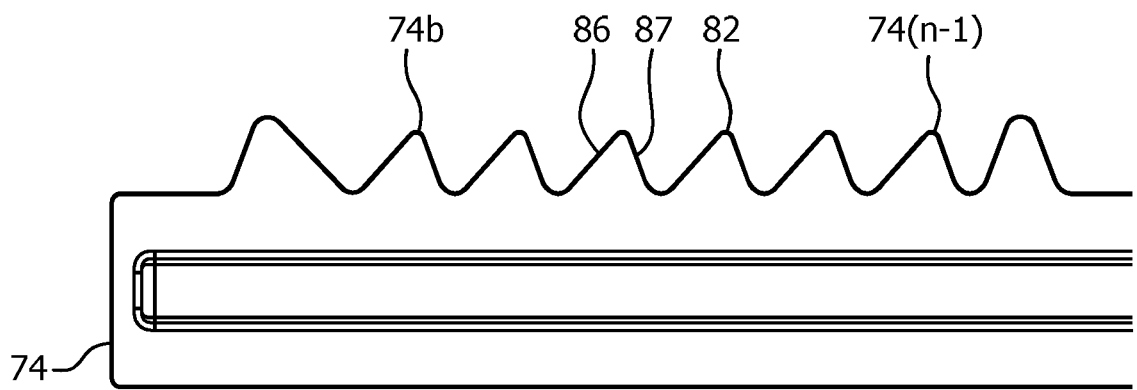
FIG. 7 is a schematic representation of a rack of an oral cleaning device in accordance with an embodiment.

Referring to FIG. 7, in one embodiment, is a rack 74 with modified rack teeth. According to this embodiment, the geometry of the second and subsequent teeth on the rack 74 is changed to reduce the contact area, thereby reducing or eliminating the probability of jamming or locking caused by misalignment. The teeth comprise an angled front surface 86 and an angled rear surface 87. For teeth 74b through 74(n-1), in contrast to the prior art teeth, the angle of the front surface of the modified teeth is different from the angle of the rear surface. According to an embodiment, the angle or slope of the front surface 86 of the rack teeth 74 is increased compared to the teeth in FIG. 6, and the area of the top surface 82 is reduced, thereby resulting in a top surface that is pointed or rounded rather than flat. Reducing the surface area of the top surface 84 promotes the proper engagement of the pinion teeth 76 with the rack teeth 74, thereby reducing the probability of jamming or locking caused by misalignment. The pinion teeth are not able to exert a downward vertical force on the flat top surface 82 of the pointed or rounded teeth, thereby reducing the amount of interference between the gear and rack without an accompanying reduction in tooth strength. According to this embodiment shown in FIG. 7, the back surface 87 of the rack teeth, which interacts with and receives driving force from the pinion teeth, has an angle that is identical or substantially similar to the angle of the prior art rack teeth in FIG. 6. As a result, the teeth of the rack are effectively angled toward the plunger side of the rack.

Figure 8:
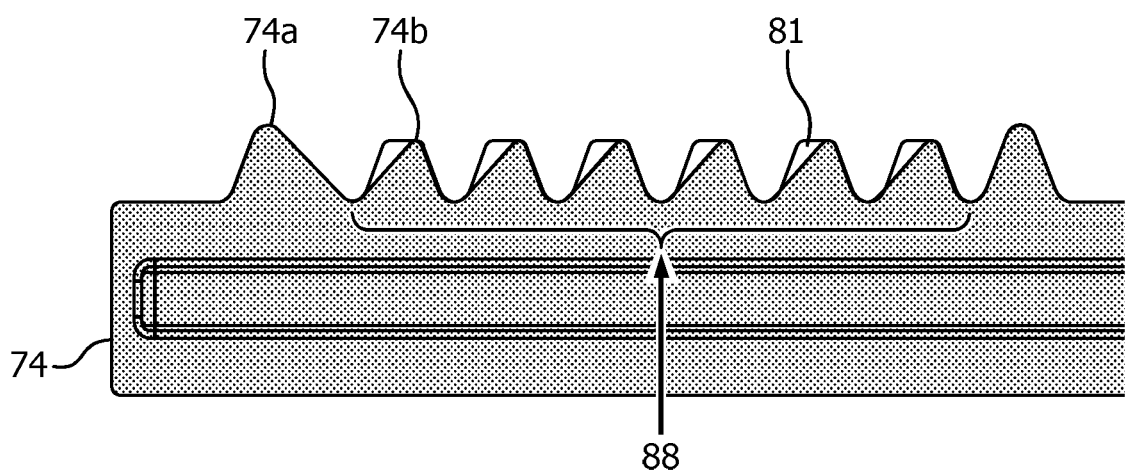
FIG. 8 is a schematic representation of a rack of an oral cleaning device in accordance with an embodiment overlaid on a prior art rack.
Figure 9A:
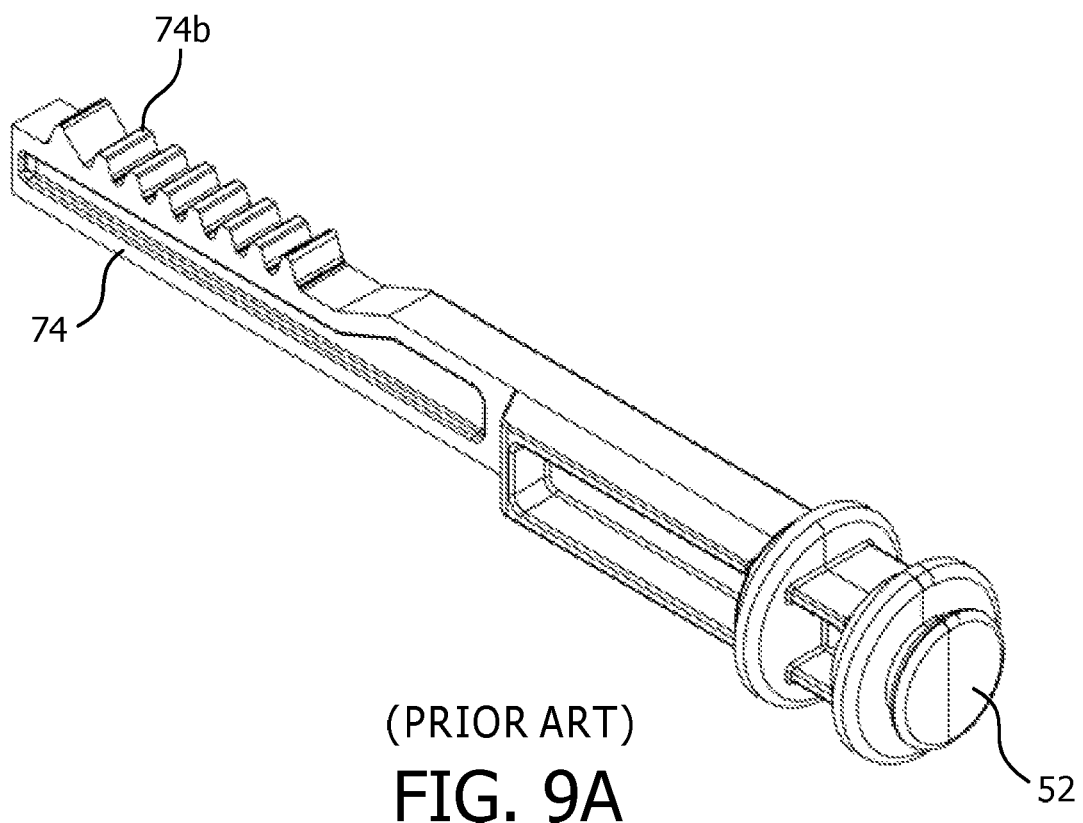
FIG. 9A is a schematic representation of a prior art rack and plunger of an oral cleaning device.
Figure 9B:
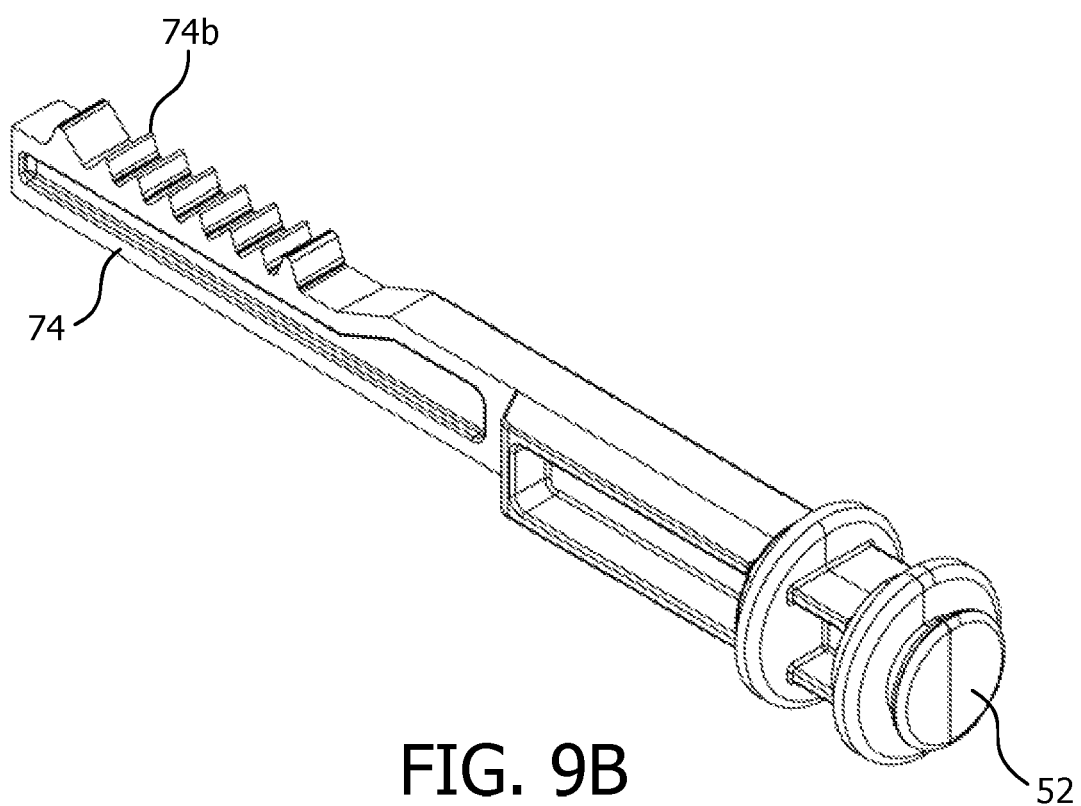
FIG. 9B is a schematic representation of a rack and plunger of an oral cleaning device in accordance with an embodiment.

FIG. 8 shows an overlay of the tooth profile of a prior art rack and a rack according to an embodiment. The change in the shape of the tooth tip and the slope of the front face of the second through next to last teeth (shown by range 88) on the rack 74 can be clearly seen, and results in a loss of region 81 of the prior art rack teeth 74. Similarly, FIG. 9A shows rack teeth 74b with a flattened stop, while FIG. 9B shows rack teeth 74b with an increased forward slope of the front surface and a rounded or pointed tip.

Although the figures show rack teeth 74b through 74g as having an increased forward slope of the front surface and a rounded or pointed tip, many different embodiments are possible. For example, all of the teeth may comprise this shape, or any number of teeth less than all may have this shape. It may be advantageous, for example, to have the teeth alternate between the prior art shape and the modified shape, to have all the teeth comprise the modified shape, or to have a first half or second half of the teeth comprise the modified shape, among other configurations.

Figure 10:
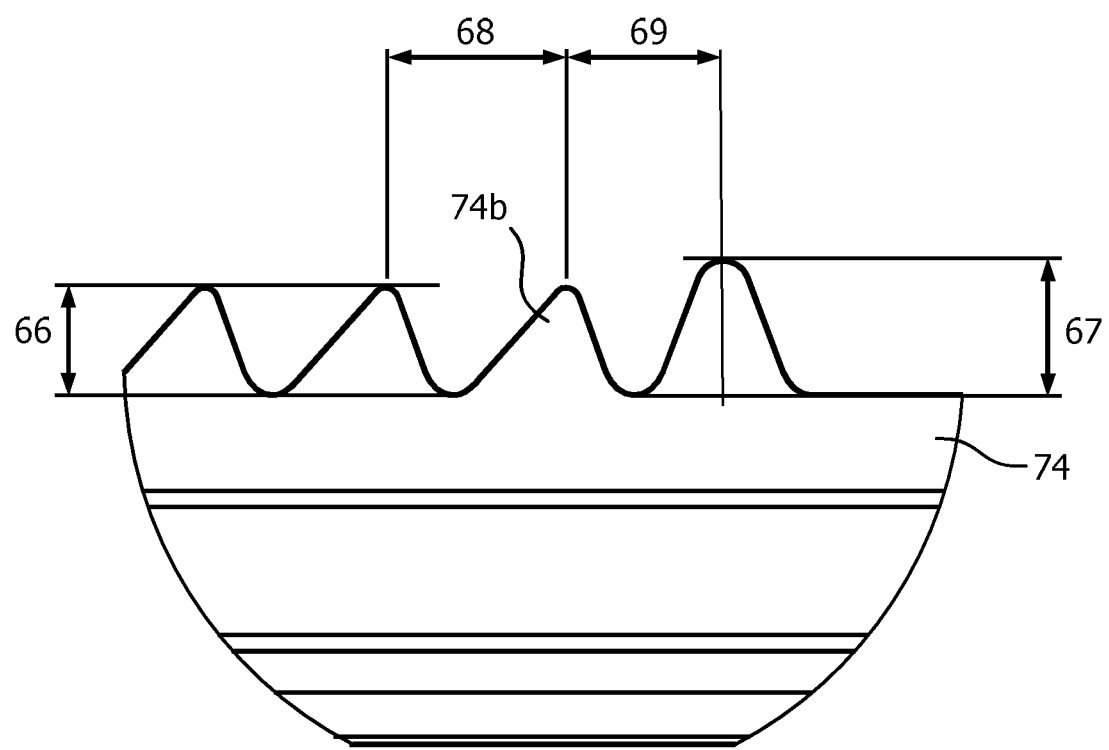
FIG. 10 is a schematic representation of a portion of a rack of an oral cleaning device in accordance with an embodiment.

Referring to FIG. 10, in one embodiment, is a side view of a portion of rack 74 with teeth. The modified teeth, which in this limited depiction comprises 74e, 74f, and 74g (although fewer or many more teeth are possible as described or otherwise envisioned herein), comprise a rack tooth height 66. According to an embodiment, the rack tooth height 66 is in the range of approximately 0.5 to 3.0 mm. It can be appreciated that this dimension would change in a part that is sized larger or smaller, accordingly, but the adjusted dimension would be proportional. In contrast, the rack tooth height 67 of the first and/or last tooth can be smaller or larger than rack tooth height 66. In FIG. 10, for example, rack tooth height 67 for the last tooth is greater than the rack tooth height 66 of the remaining depicted teeth. The rack teeth also comprise a tip spacing 68 and/or 69 which is directly proportional to the tooth spacing of the pinion teeth 76. According to an embodiment, tip spacing 68 and/or 69 is between 2 and 4 mm, although many other configurations are possible. According to an embodiment, any of the rack teeth may be shorter than the rest of the teeth, with a height less than height 66. For example, tooth 74b may be shorter than the rest of the rack teeth.

Figure 11A:
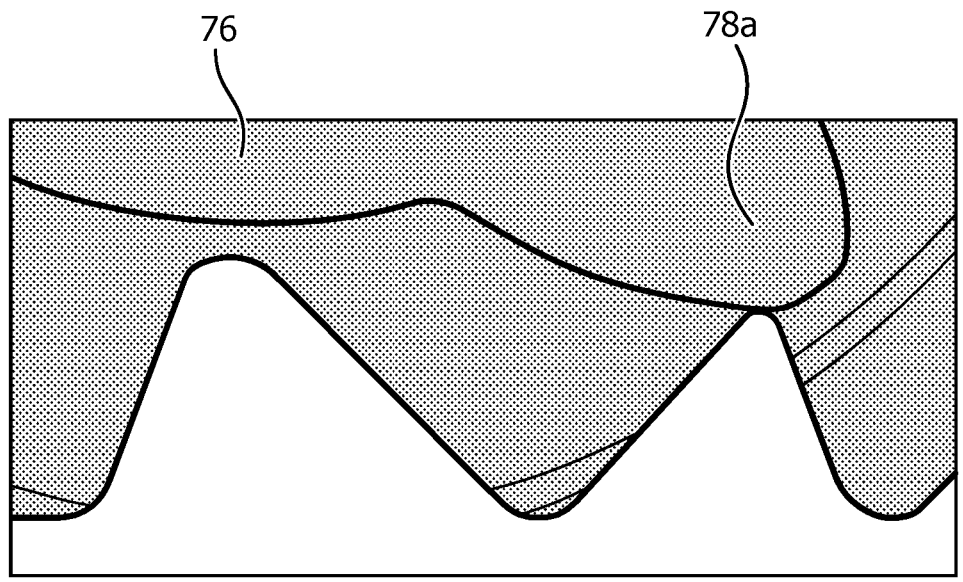
FIG. 11A is a schematic representation of a prior art rack and pinion of an oral cleaning device.
Figure 11B:
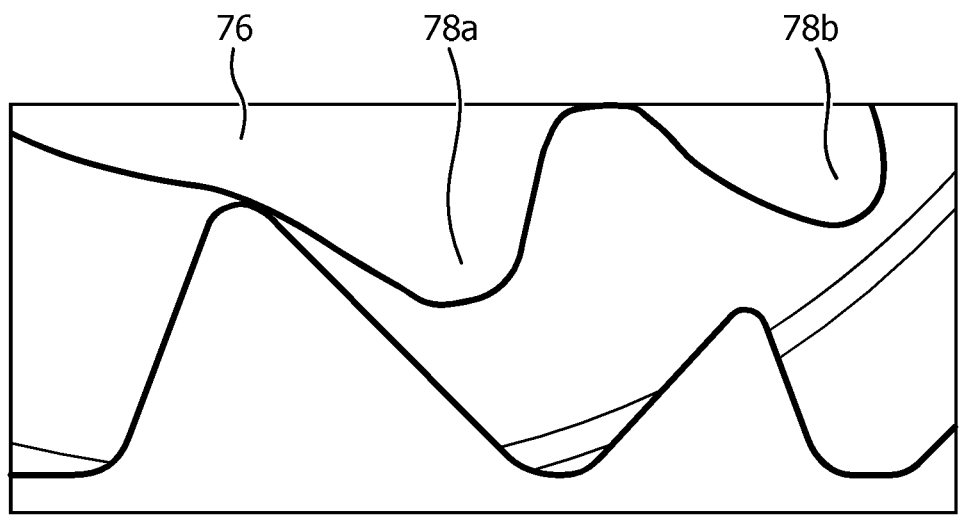
FIG. 11B is a schematic representation of a rack and pinion of an oral cleaning device in accordance with an embodiment.

Referring to FIG. 11A is a prior art rack and pinion 76 with pinion teeth 78a, where there is an increased likelihood of jamming due to interaction between the pinion teeth and rack teeth. In contrast, according to an embodiment as shown in FIG. 11B, the first tooth 78a of the pinion comprises a reduced height compared to the height of second tooth 78b of the pinion. As shown in FIG. 11B, this reduced height significantly decreases the likelihood of jamming or locking between the pinion teeth and the rack teeth, since the first tooth 78a of the pinion no longer interacts with the second tooth of the rack, instead interacting with the first tooth of the rack as intended. According to an embodiment, any of the rack teeth may be shorter than the rest of the teeth, with a height less than height 66. For example, tooth 74b may be shorter than the rest of the rack teeth.

Figure 12:
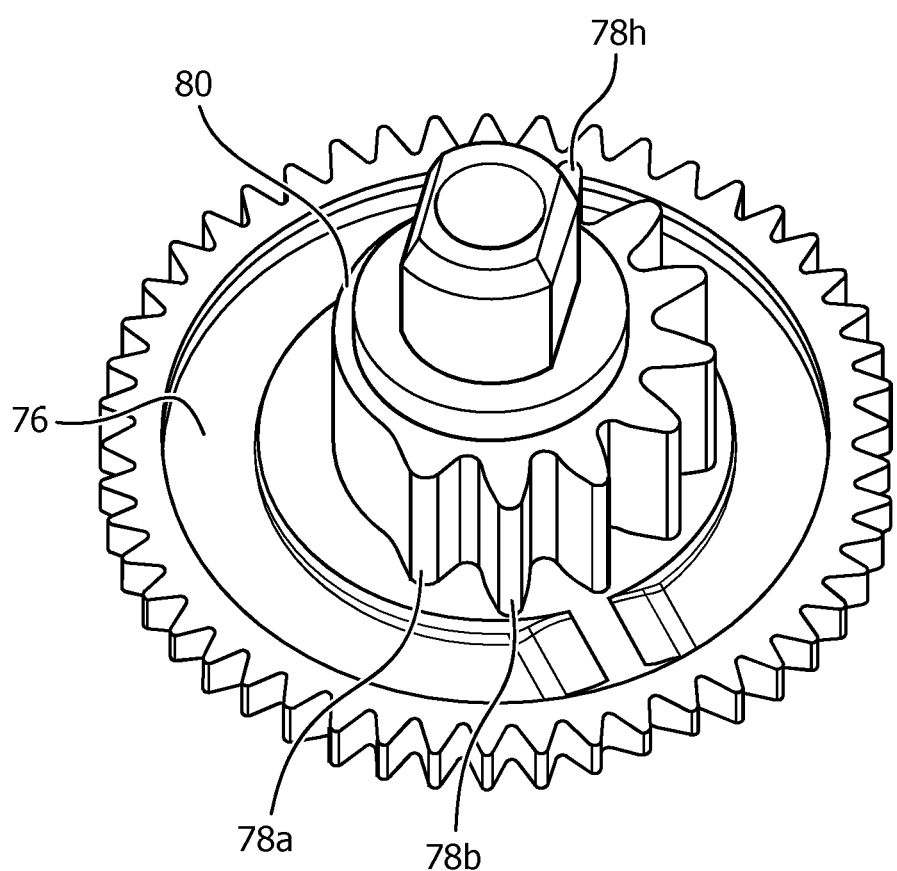
FIG. 12 is a schematic representation of a pinion of an oral cleaning device in accordance with an embodiment.

Referring to FIG. 12, in one embodiment, is a schematic representation of pinion 76 having a plurality of teeth 78 around the perimeter of a portion of the pinion, and with a section 80 with no teeth. As shown in FIG. 12, the height of first tooth 78a is less than the height of teeth 78b through 78h. This significantly reduces the likelihood of jamming or locking between the pinion teeth and the rack teeth. Although only the first tooth 78a is shown with reduced height, according to other embodiments one or more of the other teeth of pinion 76 may be reduced in height.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An oral care device comprising:
   a nozzle comprising a nozzle outlet configured to deliver a plurality of bursts of liquid and air to an oral cavity;
   a pump assembly comprising: a plunger assembly with a front portion and a rear portion, the rear portion comprising a rack assembly extending outwardly from a rear end of the rear portion; a compressible spring surrounding the plunger assembly and configured to exert a forward force on the plunger assembly; and a rack and pinion assembly configured to exert a force on the plunger assembly opposite the forward force, wherein the rack and pinion assembly comprises the rack assembly, the rack assembly comprising a plurality of rack teeth and a pinion assembly, the pinion assembly comprising a plurality of teeth arranged around a portion of the pinion; and
   a motor configured to drive the rack and pinion assembly;
   wherein the plurality of rack teeth comprise an angled front surface and an angled rear surface, the front surface of at least some of the plurality of rack teeth comprising a different angle than the rear surface, and further wherein at least some of the plurality of rack teeth comprise a pointed or rounded tip.

2. The oral care device of claim 1, wherein a plurality of the rack teeth comprises a first height, the first height between approximately 0.5 and 3.0 mm.

3. The oral care device of claim 1, wherein the pointed or rounded tips of the plurality of rack teeth comprise a tip spacing, the tip spacing being between 2 and 4 mm.

4. The oral care device of claim 1, wherein each of the second through next to last of the plurality of rack teeth comprise a pointed or rounded tip and a front surface comprising a different angle than the rear surface, and wherein the first of the plurality of rack teeth comprises an angle different from the angle of the second through next to last of the plurality of rack teeth.

5. The oral care device of claim 4, wherein each of the second through next to last of the plurality of rack teeth comprise a first height, and further wherein the first and last of the plurality of rack teeth comprise a second height, said second height being greater than said first height.

6. The oral cleaning device of claim 1, wherein the first tooth of the pinion assembly comprises a first height, the first height being less than a height of a remaining plurality of pinion teeth.

7. The oral cleaning device of claim 1, wherein the second tooth of the rack assembly comprises a first height, the first height being less than a height of a remaining plurality of rack teeth.

8. A pump assembly for an oral care device, the pump assembly comprising:
   a plunger assembly with a front portion and a rear portion, the rear portion comprising a rack assembly extending outwardly from a rear end of the rear portion;
   a compressible spring surrounding the plunger assembly and configured to exert a forward force on the plunger assembly; and
   a rack and pinion assembly configured to exert a force on the plunger assembly opposite the forward force, wherein the rack and pinion assembly comprises the rack assembly, the rack assembly comprising a plurality of rack teeth and a pinion assembly, the pinion assembly comprising a plurality of teeth arranged around a portion of the pinion;
   wherein the plurality of rack teeth comprise an angled front surface and an angled rear surface, the front surface of at least some of the plurality of rack teeth comprising a different angle than the rear surface, and further wherein at least some of the plurality of rack teeth comprise a pointed or rounded tip.

9. The pump assembly of claim 8, wherein a plurality of the rack teeth comprises a first height, the first height between approximately 0.5 and 3.0 mm.

10. The pump assembly of claim 8, wherein the pointed or rounded tips of the plurality of rack teeth comprise a tip spacing, the tip spacing being between 2 and 4 mm.

11. The pump assembly of claim 8, wherein each of the second through next to last of the plurality of rack teeth comprise a pointed or rounded tip and a front surface comprising a different angle than the rear surface, and wherein the first of the plurality of rack teeth comprises an angle different from the angle of the second through next to last of the plurality of rack teeth.

12. The pump assembly of claim 11, wherein each of the second through next to last of the plurality of rack teeth comprise a first height, and further wherein the first and last of the plurality of rack teeth comprise a second height, said second height being greater than said first height.

13. The pump assembly of claim 8, wherein the first tooth of the pinion assembly comprises a first height, the first height being less than a height of a remaining plurality of pinion teeth.

14. The pump assembly of claim 8, wherein the second tooth of the rack assembly comprises a first height, the first height being less than a height of a remaining plurality of rack teeth.

15. An oral care device comprising:
   a nozzle comprising a nozzle outlet configured to deliver a plurality of bursts of liquid and air to an oral cavity;
   a pump assembly comprising: a plunger assembly with a front portion and a rear portion, the rear portion comprising a rack assembly extending outwardly from a rear end of the rear portion; a compressible spring surrounding the plunger assembly and configured to exert a forward force on the plunger assembly; and a rack and pinion assembly configured to exert a force on the plunger assembly opposite the forward force, wherein the rack and pinion assembly comprises the rack assembly, the rack assembly comprising a plurality of rack teeth and a pinion assembly, the pinion assembly comprising a plurality of teeth arranged around a portion of the pinion, wherein the first tooth of the pinion assembly comprises a first height, the first height being less than a height of a remaining plurality of pinion teeth; and a motor configured to drive the rack and pinion assembly; wherein the plurality of rack teeth comprise an angled front surface and an angled rear surface, the front surface of each of the second through next to last of the plurality of rack teeth comprising a different angle than the rear surface, wherein each of the second through next to last of the plurality of rack teeth comprise a pointed or rounded tip, and further wherein each of the rack teeth comprises a rack tooth height between approximately 0.5 and 3.0 mm, and further wherein the second tooth of the rack assembly comprises a second height, the second height being less than the height of the remaining plurality of rack teeth.

\* \* \* \* \*